United States Patent Office 3,730,946
Patented May 1, 1973

3,730,946
PROCESS FOR MAKING CYANOARYLOXY POLYMERS AND PRODUCTS DERIVED THEREFROM
Darrell R. Heath and Joseph G. Wirth, Schenectady, N.Y., assignors to General Electric Company
No Drawing. Filed Jan. 20, 1971, Ser. No. 108,152
Int. Cl. C08g 25/00
U.S. Cl. 260—47 R                             19 Claims

ABSTRACT OF THE DISCLOSURE

Cyanoaryloxy polymers are prepared from the reaction of a dinitrobenzene containing a cyano group directly attached to the benzene nucleus with an alkali-metal salt of a divalent carbocyclic aromatic radical in the presence of a dipolar aprotic solvent.

---

This invention is concerned with a process for making cyanoaryloxy polymers and products derived therefrom. More particularly, the invention relates to a process which comprises effecting reaction in the presence of a dipolar aprotic solvent of a mixture of ingredients comprising (1) a benzenoid compound of the general formula I
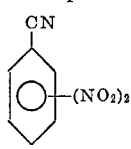

such as 2,4-dinitrobenzonitrile and 2,6-dinitrobenzonitrile, and (2) an alkali metal salt of an organic compound of the general formula II          Alk—O—R—O—Alk where R is a divalent carbocyclic aromatic radical, Alk is an alkali metal atom, e.g., sodium, potassium, etc., and the —NO₂ groups are in the 2,4- or 2,6-positions relative to the cyano group. By means of the above reaction polymeric compositions composed of recurring structural units of the formula IIA
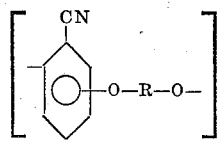

are obtained where R has the meaning above and the —O—R—O— grouping is positioned ortho or para to the cyano group.

The invention is also concerned with polymeric compositions having the repeating units III
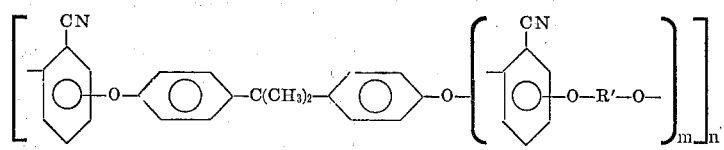

where R' is selected from the following divalent carbocyclic aromatic radicals:

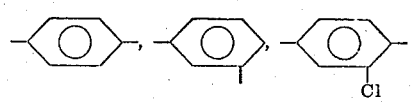

and

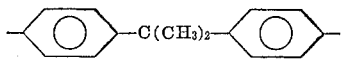

radicals, where the groupings

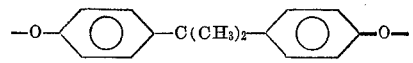

and —O—R'—O— are ortho or para to the neighboring cyano groups, m is 0 or 1, and the number of repeating units, n is a whole number greater than 1, for instance, from 2 to as high as 5000 or more.

It is known that certain nitro-substituted aromatic ketone compositions can be reacted with alkali metal phenolates to form phenoxy derivatives thereof. Thus, Radlmann et al. in Die Makromolekulare Chemie, 130 (1969), pages 45–54 disclose the preparation of polyether ketones by effecting reaction between nitro-substituted aromatic compounds containing a carbonyl group between two aryl nuclei, e.g., 4,4'-dinitrobenzophenone, with the dialkali metal salt of bis-(p-hydroxyphenyl) dimethyl methane, known as "bisphenol-A," in a dipolar aprotic solvent, such as dimethyl sulfoxide to give a phenoxy polymer containing units of the formula IV
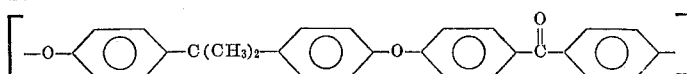

However, when an attempt is made to carry out the same reaction between the dialkali metal bisphenolate and a dinitroaromatic compound, containing a nuclearly substituted carboxyl group, employing the same conditions as above, it is found that the reaction apparently does not proceed and there is no evidence of the formation of any polymer having the repeating unit.

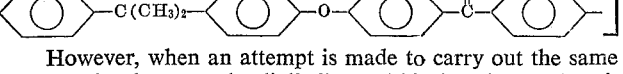

where R has the meaning above.

Unexpectedly, we have discovered that although the reaction between the alkali metal bisphenolate will not take place with the dinitrobenzoic acid, we are able to make polymeric aryloxy derivatives of bisphenolates and other dialkali metal dihydroxy aromatic compounds if the carboxy group is replaced with a cyano group. This increased reaction between the alkali metal diphenolate and the benzonitrile derivative results usually in almost quantitative yields of the desired polymeric composition. The presence of the cyano group in the polymer also provides improvements in the properties of the polymer over the same polymer from which the cyano group is absent. If desired, the carboxysubstituted polymer can be readily obtained by hydrolysis of the cyano polymer.

By virtue of our invention, we are able to prepare numerous cyanosubstituted polymeric compositions by reaction of a benzenoid compound of Formula I with an alkali-metal salt of Formula II. In addition, we are able to make carboxy-substituted polymeric compositions heretofore difficult to prepare, by hydrolysis of the cyano group on the polymer molecule. In effecting the above reaction, it is important that one use a dipolar aprotic solvent in the reactioin of the benzenoid compound of Formula I.

Among the divalent carbocyclic armoatic radicals which R may represent (mixtures of such radicals are also included) are, for instance, divalent aromatic hydrocarbon radicals of from 1 to 20 carbon atoms, for instance, phenylene, biphenylene, naphthylene, etc. Included are residues of, e.g., hydroquinone, resorcinol, chlorohydroquinone, etc. In addition R may be a residue of a dihydroxy diarylene compound in which the aryl nuclei are joined by either an aliphatic group, a sulfoxide group, sulfonyl group, sulfur, carbonyl group, oxygen, the

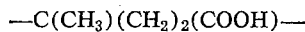

group, etc. Typical of such diarylene compounds from which the dialkali metal salt of Formula II may be prepared by reacting the aforesaid diarylene compound with two mols of an alkali-metal hydroxide per mol of the latter may be mentioned:

2,4'-dihydroxydiphenylmethane;
bis-(2-hydroxyphenyl)-methane;
2,2-bis-(4-hydroxyphenyl)-propane hereinafter identified as "bisphenol-A" or "BPA";
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis(3-methyl-4'-hydroxyphenyl)-propane;
2,2-bis-(3-phenyl-4-hydroxyphenyl)-propane;
2,2-bis(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-propane;
2,2-bis-(4-hydroxyphenyl)-1-phenylpropane;
2,4-dihydroxybenzophenone;
4,4'-dihydroxydiphenyl sulfone;
2,4'-dihydroxydiphenyl sulfone;
5'-chloro-2,4'-dihydroxydiphenyl sulfone;
3'-chloro-4,4'-dihydroxydiphenyl sulfone;
4,4'-dihydroxytriphenyl disulfone;
4,4'-dihydroxydiphenyl ether;
4,4'-dihydroxydiphenyl sulfide;
4,4'-dihydroxy-o-biphenyl ether;
the 4,3'-, 4,2'-, 4,1'-,2,2'-,2,3'-, etc. diphydroxydiphenyl ethers;
4,4'-dihydroxybenzophenone;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
2-methyl-2-carboxyethyl-bis-(4-hydroxyphenyl)-propane
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxy-diphenyl ether, etc., dihydric phenols substituted on the aryl nucleus with alkyl, alkenyl, cycloaliphatic, cycloalkenyl, aryl, alkaryl, numerous examples of which have been given above, as well as the dihydroxy toluenes, the dihydroxy xylenes, dihydroxy pyridines, dihydroxy anthraquinones, dihydroxy benzoic acids, other dihydroxy benzophenones, etc.

The R radical can have many inert substituents on the aryl nuclei as recited above, for instance, monovalent hydrocarbon radicals such as methyl, ethyl, cycloaliphatic radicals (for instance, cyclopentyl, cyclohexyl etc.), etc.; aryl radicals, e.g., phenyl, biphenyl, etc., radicals; alkaryl radicals, e.g., tolyl, ethylphenyl, etc., radicals; aralkyl radicals, e.g., benzyl, phenylethyl, etc., radicals. The substituent on the aryl radical accordingly can be any one which does not constitute or contain an atom or radical reactive with the alkali-metal salt of Formula II.

The means whereby the process of the present invention may be practiced and polymeric compositions herein defined obtained can be varied widely. When dialkali metal salts of Formula II are used with the benzenoid compound of Formula I, the ingredients are advantageously present in an equal molar ratio for optimum molecular weight of and properties of the polymer. Slight molar excesses, e.g., about 0.001 to 0.01 molar excess of either the benzenoid compound or of the dialkali metal salt of Formula II may be employed without departing from the scope of the invention for molecular weight control.

In making the alkali-metal salts of Formula II, it is sometimes advantageous to preform these salts by reacting the corresponding dihydroxy organic compound with an alkali-metal hydroxide such as sodium hydroxide, potassium hydroxide, etc. For instance, the dialkali salt of bisphenol-A may be obtained, for instance, by reacting 2 mols of sodium hydroxide per mole of bisphenol-A. Persons skilled in the art will have no difficulty in determining how to make the alkali-metal salts of Formula II for use with the benzenoid compound of Formula I.

Alternatively, the bisphenol may be converted to its alkali-metal salt during reaction with benzenoid compounds of Formula I by addition of an alkali-metal carbonate in adequate molar concentrations to a reaction mixture composed of the benzenoid compound of Formula I and the precursor hydroxy aromatic compound required to form the alkali-metal salt of Formula II.

The benzenoid compounds of Formula I which may be employed in the practice of the present invention are 2,4-dinitrobenzonitrile and 2,6-dinitrobenzonitrile.

The conditions of reaction whereby the alkali-metal salt of Formula II is reacted with the benzenoid compound of Formula I can be varied widely. Generally, temperatures of the order of about 50–150° C. are advantageously employed, although it is possible to employ lower or higher temperature conditions depending on the ingredients used, the reaction product sought, time of reaction, solvent employed, etc. In addition to atmospheric pressure, superpressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 30 minutes to as much as 30 to 40 hours are advantageously employed to obtain the maximum yield Thereafter the reaction product can be treated in the manner required to effect precipitation and/or separation of the desired polymeric reaction product. Generally, common solvents such as diethyl ether, methanol, methylene chloride, etc., are employed for the purpose.

It is important that the reaction between the benzenoid compound of Formula I and the alkali-metal salt of Formula II (mixtures of such alkali-metal salts can also be used) be carried out in the presence of a dipolar aprotic solvent. The term "dipolar aprotic solvent" is intended to mean any organic solvent which has no active protons which may interfere with the reaction herein described. As will be evident to those skilled in the art, any dipolar aprotic solvent which is capable of dissolving the reactants and causing intimate contact of the reaction ingredients may be used.

Among the preferred aprotic solvents which may be employed in the practice of this invention are non-acid, oxygen-containing, nitrogen-containing organic solvents. These include but are not limited to, for instance, N,N-dimethylacetamide, N-methylpyrrolidone, N,N-dimethylformamide, dimethylsulfoxide, hexamethylphosphoramide, etc.

The amount of solvent used in the reaction mixture may be varied widely. Generally, on a weight basis, one can employ from 0.5 to 50 or more parts of the solvent per part of total weight of the reactants, namely, the benzenoid compound of Formula I and the alkali-metal salt of Formula II. The amount of solvent is not critical, but generally we have found that on a weight basis one can employ from 2 to 20 parts of the solvent per part of the total weight of the benzenoid compound and the alkali-metal salt, whether the latter is preformed or prepared in situ.

The invention is also intended to include within its scope the process for making copolymeric compositions containing recurring units of Formula III and recurring units of the formula V 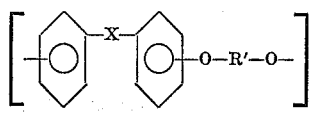

where R' has the meaning above, the grouping

VI         —O—R'—O— is ortho or para to X, and X is selected from the class of groupings consisting of

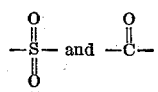

The residuum grounding

VII 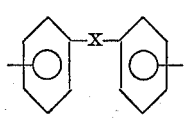

can be derived from any dihalocycloaromatic compound (or mixture of dihalocycloaromatic compounds) of the formula VIIa 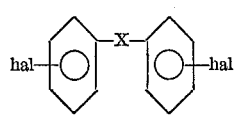

which has two halogens bonded to different benzene rings having an electron withdrawing group in at least one of the positions ortho or para to the halogen atom. Preferably the dihalo compound is a polynuclear compound of Formula VIIa where the halogens are attached to different benzenoid rings and having an electron withdrawing group in the ortho or para position of that benzenoid nucleus, said electron withdrawing group "X" being selected from the class consisting of

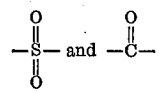

and hal is any halogen, e.g. chlorine, bromine, etc. Among such halo compounds may be mentioned 4,4'-dichlorodiphenylsulfone, 4,4' - difluorodiphenylsulfone, 4,4' - dichlorodibenzophenone, 2,2' - dichlorodiphenylsulfone, 2,2'-dichlorodibenzophenone, etc.

The incorporation of recurring units of Formula V can be carried out in several ways. Advantageously, the dihalocycloaromatic compound is interacted simultaneously when the alkali-metal salt of Formula II is interacted with the benzenoid compound of Formula I. It is desirable that an additional amount of alkali metal hydroxide or alkali metal carbonate be employed when a dihalocycloaromatic compound is in the reaction mixture, in order to effect the desired interaction between the dihalocycloaromatic compound and the alkali-metal salt and the benzenoid compound of Formula I. Alternatively, the precursor dihydroxy aromatic compound resulting in the alkali-metal salt can be used as such with the dihalocycloaromatic compound and the benzenoid compound but employing an amount of alkali metal carbonate sufficient on a molar basis to give an adequate amount of the alkali-metal salt to react with both the benzenoid compound of Formula I and the dihalocycloaromatic compound.

The molar ratio of the dihalocycloaromatic compound to the dialkali metal salt can be varied widely depending on the type of polymer desired, the properties required, etc. Where residium groups of Formula VII are desired in the polymeric structure, one can employ from as low as 1 to as high as 50 mol percent of the dihalocycloaromatic compound, based on the total molar concentration of the dihalocycloaromatic compound and the benzeroid compound of Formula I. In general, we have found that good results are obtained when the dihalocycloaromatic compound is within the molar range of from about 1 to 25 mol percent based on the total molar concentration of the latter and the benzenoid compound of Formula I.

In order that those skilled in the art may better understand how the present invention may be practiced, the following examples are given by way of illustration and not by way of limitation. All parts are by weight unless otherwise indicated. Unless otherwise indicated, the intrinsic viscosity ($\eta$) was measured at 25° C. employing 0.5 gram polymer per 100 grams $CH_2Cl_2$ and is given in dl./g.

In the following examples, the "Tg" (which stands for the glass transition temperature) of a polymer is defined as the temperature at which the volume versus the temperature curve undergoes a change in slope. In physical terms, this corresponds to the temperature at which the polymer undergoes a change from the glassy state to the rubbery state, i.e., the brittle to ductile state. In the following examples, the Tg has been determined by differential scanning calorimetry. Further directions for determining the Tg may be found in an article by F. W. Billmeyer, Jr., in "Textbook of Polymer Science," Interscience Publishers (1962), pages 198–204. The term "TGA," which stands for thermogravimetric analysis, is the breakpoint defined as the temperature at which the rate of weight loss from the sample being heated exceeds 5% per hour at a heating rate of 10° C. per minute. For further description of thermogravimetric analyses, attention is directed to "Techniques and Methods of Polymer Evaluation," vol. 1, Thermal Analysis, by P. E. Slade, Jr. and L. T. Jenkins (editors), published by Marcel Dekker (1966), pages 87–216.

EXAMPLE 1

A mixture of 4.5656 grams (0.02 mol) bisphenol-A, 1.6 grams (0.04 mol) sodium hydroxide (in the form of 3.168 grams of a 50.5% aqueous solution), 20 ml. dimethyl sulfoxide (DMSO) and 20 ml. toluene was heated under reflux in a nitrogen atmosphere for about 8 hours. A Dean Stark trap was used to remove the water formed during the reaction. The remaining toluene was removed by distillation and the mixture allowed to cool to room temperature. Thereafter, a solution of 3.8624 grams (0.02 mol) 2,4-dinitrobenzonitrile in 15 ml. anhydrous DMSO was added and the mixture was stirred for 1.5 hours at 125–130° C. The DMSO solution, after cooling was poured into methanol and the formed precipitate was filtered, dissolved in methylene chloride, precipitated twice from methanol, and dried in vacuum to give about 3.3 grams of a powder having an intrinsic viscosity $\eta=0.29$. This polymer was composed of recurring structural units of the formula

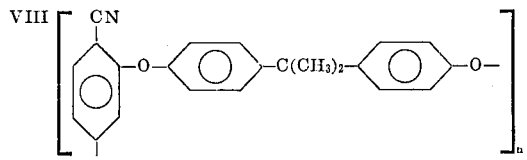

where $n$ is a whole number in excess of 1. The identity of the polymer was established by the following analyses:

Found (percent): C, 80.3; H, 5.16; N, 4.29. Calculated (percent): C, 80.8; H, 5.20; N, 4.28.

The polymer had a Tg of 152° C. and a TGA breakpoint of 440° C. in nitrogen and 430° C. in air. Unsubstituted polyphenylene oxides (i.e., free of cyano groups) prepared from m- or p-chlorophenol have Tg's below 100° C.

EXAMPLE 2

When bisphenol-A and 2,4-dinitrobenzonitrile were reacted similarly as in Example 1 with the exception that 5.53 grams (0.04 mol) potassium carbonate was substituted for the sodium hydroxide but the conditions of reaction were comparable to those recited in Example 7 (infra), a polymer having the same recurring structural units as Formula V and an $\eta=0.41$ was obtained.

EXAMPLE 3

A mixture of 4.5656 grams (0.020 mol) bisphenol-A, 1.6 grams (3.168 grams of a 50.5% aqueous solution, 0.04 mol) sodium hydroxide, 15 ml. DMSO and 15 ml. benzene was stirred under nitrogen atmosphere at reflux over a Dean Stark trap for 5 hours, and the benzene was removed by distillation until a homogeneous solution resulted. The internal temperature was held at 145° C. while 3.8624 grams (0.020 mol) 2,6-dinitrobenzonitrile in 15 ml. DMSO was added, and after 15 minutes reaction at 145° C., 10 ml. o-dichlorobenzene was added to the mixture. The reaction mixture was stirred for 45 minutes at 145° C., cooled, poured into methanol, and the precipitate was isolated by filtration. The precipitate was washed with methanol, dried, dissolved in methylene chloride, precipitated from methanol, washed with water, reprecipitated a second time from methanol, and dried "in vacuo" at 80° C. to give 4.9 grams, 75% yield, of a tan-colored polymer having an $\eta=0.51$. This polymer, which had a Tg 173° C., TGA 385° C. (air), and TGA 420° C. (N₂) was composed of recurring structural units of the formula

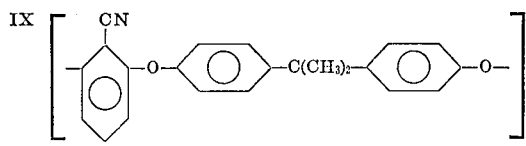

where $n$ is a whole number in excess of 1. The following analyses confirmed this structure:

Found (percent): C, 80.0; H, 5.25; N, 4.21. Calculated (percent): C, 80.8; H, 5.20; N, 4.28.

A film sample of this polymer pressed at 250° C. and 2000 p.s.i. for 5 minutes had the following properties:

Tensile strength, p.s.i. _____ 10,300
Percent elongate _____ 15
Dielectric constant _____ 2.8

EXAMPLE 4

A mixture of 4.5656 grams (0.020 mol) of bisphenol-A, 1.6 grams (3.168 grams of a 50.5% aqueous solution, 0.04 mol) sodium hydroxide, 15 ml. DMSO and 15 ml. benzene was stirred under nitrogen atmosphere at reflux over a Dean Stark trap for 3 hours and the benzene was removed by distillation until the internal temperature exceeded 150° C. Then 2.8716 grams (0.010 mol) 4,4'-dichlorodiphenylsulfone in 10 ml. of hot chlorobenzene was added over 10 minutes and the mixture was stirred at 155° C. for 1.5 hours. The temperature was lowered to 150° C. and 1.9312 grams (0.010 mol) 2,6-dinitrobenzonitrile in 10 ml. DMSO was added and stirring was continued for 15 minutes. The mixture was allowed to cool; 50 ml. methylene chloride was added, and the solution poured into 500 ml. of methanol. The formed precipitate was filtered, washed with methanol and water, and dried in vacuo at 100° C., was then redissolved in methylene chloride, filtered, reprecipitated in methanol and again dried in vacuo to give 7.0 grams (91% yield) of a white stringy polymer. This copolymer, which had a Tg 178° C., TGA 430° C. (air), 420° C. (N₂), and an intrinsic viscosity $\eta=0.38$, was composed of recurring structural units of Formula IX and of

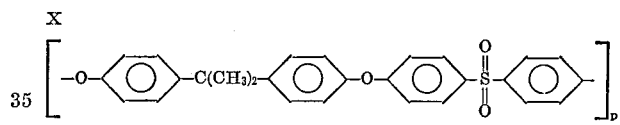

where $p$ is a whole number in excess of 1. The structure of the polymer was confirmed by the following analyses:

Found (percent): C, 77.0; H, 5.10; N, 3.2; S, 4.4. Calculated (percent): C, 76.5; H, 5.07; N, 1.82; S, 4.17. When 4,4'-dichlorodibenzophenone is substituted for the aforesaid 4,4'-dichlorodiphenyl sulfone, a copolymer is obtained composed of recurring units of Formula IX and of

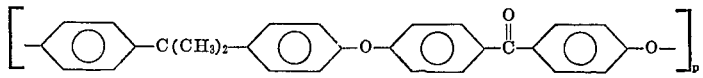

where $p$ has the meaning above.

EXAMPLE 5

A mixture of 4.5656 grams (0.020 mol) bisphenol-A, 1.60 grams (3.168 grams of a 50.5% aqueous solution, 0.04 mol) of sodium hydroxide, 15 ml. DMSO, and 15 ml. benzene was stirred under nitrogen atmosphere at reflux over a Dean Stark trap for 3 hours and the benzene was removed by distillation. The temperature was reduced to 140° C. and 1.9312 grams (0.010 mol) of 2,6-dinitrobenzonitrile and 1.9312 grams (0.01 mol) of 2,4-dinitrobenzonitrile dissolved in 20 ml. of DMSO were added and the mixture was stirred at 135° to 140° C. for 30 minutes. A 1% excess of 2,6-dinitrobenzonitrile was added; the mixture was stirred for an additional 5 minutes at 135–140° C., cooled, and then poured into 500 ml. of methanol. The precipitate was filtered and worked up in essentially the same manner as in Example 4 to give 5.8 grams (89% yield) of a polymer having a Tg 160° C.; TGA 420° C. (air), 425° C. (nitrogen); and an $\eta=0.60$. The polymer was composed of recurring structural units of the Formulas VIII and IX. Analyses of the polymer confirmed this:

Found (percent): C, 80.1; H, 5.3; N, 4.25. Calculated (percent): C, 80.8; H, 5.20; N, 4.28.

EXAMPLE 6

A mixture of 4.0440 grams (0.020 mol) 4,4'-dihydroxy-diphenylether, 1.60 grams (3.168 grams of a 50.5% aqueous solution, 0.04 mol) sodium hydroxide, 15 ml. DMSO, and 15 ml. benzene was stirred under a nitrogen atmosphere at reflux over a Dean Stark trap for 3 hours and the benzene was distilled. The temperature was reduced to 140° C. and 3.8624 grams (0.02 mol) 2,4-dinitrobenzonitrile in 20 ml. dry DMSO was added and the mixture was stirred at 135–140° C. for 45 minutes. After 40 minutes reaction, 0.04 gram of 2,4-dinitrobenzonitrile was added. The mixture was cooled and the product was isolated by filtration of the precipitate formed on adding the reaction mixture to methanol. The polymer was dried in vacuo at 80° C. to give 4.7 grams (78.5% yield) of a fine powder having Tg 136° C.; TGA 360° C. (air), 380° C. (nitrogen), and an intrinsic viscosity η=0.24. This polymer was composed of recurring units of the formula XI 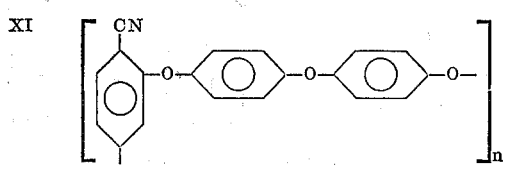

where $n$ is a whole number in excess of 1. The following analyses confirmed the polymer structure:
Found (percent): C, 73.3; H, 3.7; N, 4.4. Calculated (percent) C, 75.74; H, 3.66; N, 4.61.

EXAMPLE 7

A mixture of 1.1414 grams (0.005 mol) bisphenol-A, 0.7728 gram (0.005 mol) chlorohydroquinone, 1.9312 grams (0.010 mol) 2,6-dinitrobenzonitrile, and 5.53 grams (0.04 mol) potassium carbonate was stirred under nitrogen atmosphere at room temperature while 20 ml. of dry DMSO was added. The mixture was stirred at room temperature for 30 minutes and at 115° C. for 2 hours, cooled, and poured into 500 ml. methanol. The formed precipitate was worked up similarly as in Example 4 to give 2.5 grams (87.8%) of a stringy polymer having Tg 174° C.; TGA 410° C. (air), TGA 410° C. (nitrogen), and an intrinsic viscosity η=0.50. The identity of the polymer as being composed of recurring structural units of Formula IX and of the formula XII 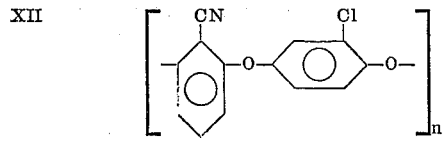

where $n$ is a whole number in excess of 1, was confirmed by the following analyses:
Found (percent): C, 72.5; H, 4.1; N, 5.0; Cl, 5.9. Calculated (percent): C, 73.7; H, 4.04; N, 4.91; Cl, 6.45.

EXAMPLE 8

A mixture of 1.1414 grams (0.005 mol) bisphenol-A, 0.5505 gram (0.005 mol) resorcinol, 1.9312 grams (0.010 mol) 2,6-dinitrobenzonitrile, and 5.53 grams (0.04 mol) potassium carbonate was stirred under a nitrogen atmosphere at room temperature while 20 ml. of dry DMSO was added. The solution was stirred for 30 minutes at room temperature, 2 hours at 115° C. and was cooled and added to 500 ml. of methanol. The granular precipitate obtained was worked up in a manner similar to that described in Example 4 to give 2.0 grams (75% yield) of a polymer having Tg 155° C.; TGA 390° C. (air), TGA 400° C. (nitrogen); and an intrinsic viscosity η=0.34.

This polymer was composed of recurring structural units of Formula IX and of the formula XIII 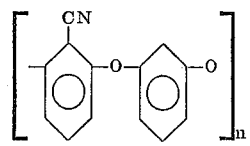

where $n$ is a whole number in excess of 1. The following analyses confirmed the structure of the polymer:
Found (percent): C, 77.9; H, 4.6; N, 5.1. Calculated (percent): C, 78.4; H, 4.48; N, 5.23.

EXAMPLE 9

A mixture of 2.0545 grams (0.009 mol) of bisphenol-A, 0.1101 gram (0.001 mol) of hydroquinone, 1.9312 grams (0.01 mol) 2,6-dinitrobenzonitrile, and 5.53 grams (0.04 mol) potassium carbonate was stirred under a nitrogen atmosphere at room temperature while 20 ml. of dry, distilled DMSO was added and the solution was stirred at room temperature for 30 minutes and at 114° C. for 2 hours. The mixture was cooled and added to 500 ml. of rapidly stirring methanol and the precipitate which separated was worked up in a manner similar to that described in Example 4 to give a polymer having a Tg 176° C.; TGA 415° C. (air), TGA 430° C. (nitrogen); and an intrinsic viscosity η=0.55. This polymer was composed of recurring structural units of Formula IX and of the formula XIV 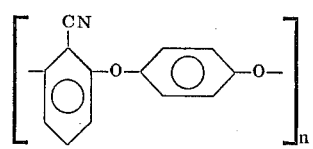

where $n$ is a whole number in excess of 1. The following analytical results established the structure of the polymer:
Found (percent): C, 80.1; H, 5.25; N, 4.50. Calculated (percent): C, 80.4; H, 5.00; N, 4.44.

EXAMPLE 10

Employing essentially the same manner of preparation as described in Example 9, 2,6-dinitrobenzonitrile, bisphenol-A, and hydroquinone were interacted while varying the molar concentrations of the bisphenol-A from 10 to 75%, and the hydroquinone from 90 to 25% based on the total molar concentration of these latter two ingredients. In each instance, reaction was carried out in essentially the same manner as described in Example 9 and the polymeric product was worked up in substantially the same manner. The polymer was composed of the same structural units as recited in Example 9 with the exception that the molar concentration of units IX and XIV in the copolymeric product varied in the same ratio as the molar concentrations of the precursor bisphenol-A and hydroquinone. The following Table I shows the molar concentrations of dihydroxy aromatic compounds to make the polymers, the TGA's, the Tg's, and the intrinsic viscosities of the polymers obtained. Table 2 shows the analytical results for the polymeric compositions in this example based on analyses for the main elements in the polymer.

TABLE 1

| Sample number | Molar concentration bisphenol-A, percent | Molar concentration hydroquinone, percent | Tg, °C. | TGA, °C. | | Intrinsic viscosity |
|---|---|---|---|---|---|---|
| | | | | Air | Nitrogen | |
| 10a | 25 | 75 | 177 | 450 | 470 | [2] Insoluble |
| 10b | 75 | 25 | 173 | 380 | 410 | .052 |
| 10c | 50 | 50 | 173 | 400 | 440 | 0.47 |
| 10d | 10 | 90 | ([2]) | 400 | 430 | [1] Insoluble |

[1] These copolymers were unexpectedly insoluble in $CH_2Cl_2$ at 25° C. but could still be fused and pressed at elevated temperatures and pressures into strong cohesive films.
[2] Not detectible.

TABLE 2

| Sample number | Analysis, percent | | | | | |
| --- | --- | --- | --- | --- | --- | --- |
| | Found | | | Calculated | | |
| | C | H | N | C | H | N |
| 10a | 78.1 | 4.2 | 5.9 | 76.7 | 3.98 | 5.87 |
| 10b | 79.1 | 4.9 | 4.6 | 79.75 | 4.87 | 4.71 |
| 10c | 77.7 | 4.5 | 5.1 | 78.4 | 4.48 | 5.23 |
| 10d | 75.0 | 3.7 | 6.3 | 75.25 | 3.61 | 6.32 |

The following example illustrates the effect of using a dinitrobenzoic acid reactant with the alkali-metal salt. More particularly, to a solution of 2.121 grams (0.010 mol) 2,6-dinitrobenzoic acid and 2.283 grams (0.010 mol) bisphenol-A in 20 ml. DMSO was added 5.5 grams (0.04 mol) anhydrous potassium carbonate. The resulting suspension was heated at 140° C. in a nitrogen atmosphere for 24 hours. During this heating period, aliquot portions were withdrawn at intervals of 2 hours, 8 hours, 16 hours, and 24 hours reaction time and added to a large excess of methanol to determine whether any polymer had formed. At no time, was any polymeric precipitate observed nor was any polymer obtained, but rather the starting ingredients remained in the reaction mixture.

The polymeric compositions herein described and claimed (particularly those having an intrinsic viscosity of at least η=0.05 when measured in CH₂Cl₂ at 25° C.) may be used to form fibers, films, or molded products. Thus, either by extrusion from melt or by depositing from solution, fibers derived from these polymeric compositions may be formed and used in the preparation of various textile materials designed for clothing and similar applications. In addition, solutions of the polymers can be used to coat electrical conductors for insulation purposes. If desired, such solutions can be used as outside coating means for conductors already insulated with, for instance, heat resistant insulation such as polyimide resins; such outer coatings improve the abrasion resistance of the insulated conductor.

Various fillers may be incorporated in the polymeric compositions prior to molding thereof. Among such fillers may be mentioned glass fibers, carbon fibers, carbon black, titanium dioxide, silica, mica, asbestos, bentonite, etc. Molded products derived from such a mixture of ingredients can be used as gears, handles for cooking utensils, etc. The incorporation of abrasive particles such as carborundum, diamond powder, etc., makes such molded products derived from such polymeric compositions useful as bearings, grinding wheels, etc. The addition of carbon, silicon carbide, powdered metal, conducting oxides, etc. to the polymeric compositions results in the so-called resistance or semiconducting paints which have many useful applications.

The polymeric compositions herein described may also be incorporated into other materials to modify the properties of the latter. For example, they may be compounded with substances such as natural or synthetic rubbers, natural resins such as rosin, copal, shellac, etc.; synthetic resins such as phenol-aldehyde resins, alkyd resins, vinyl resins, polyamide resins, polyimide resins, esters of acrylic and methacrylic acid, etc.; cellulosic materials such as paper, inorganic and organic esters of cellulose such as cellulose nitrate, cellulose acetate, cellulose ethers, such as methyl cellulose, ethyl cellulose, etc.

Laminated products may be made by superimposing organic or inorganic fiber sheet materials coated and impregnated with the polymeric compositions and thereafter bonding the sheets under heat and pressure. Shaped articles formed from such compositions under heat and pressure in accordance with the practices now widely used in the plastics art have a number of well known applications such as in the decorative field, electrical board field, etc.

It will of course be apparent to those skilled in the art that other conditions of reaction and other ingredients; in addition to those specifically described in the foregoing examples, may be employed without departing from the scope of the invention. Thus, it is apparent that many of the conditions outlined previously can be used for making the compositions herein described and claimed. Also, it will be apparent that the ingredients, and proportions of ingredients chosen for making the polymeric compositions disclosed and claimed can be varied widely, many examples of which have been given above.

What we claim as new and desire to secure by Letters Patent of the United States is:

1. A polymeric composition consisting essentially of the repeating unit

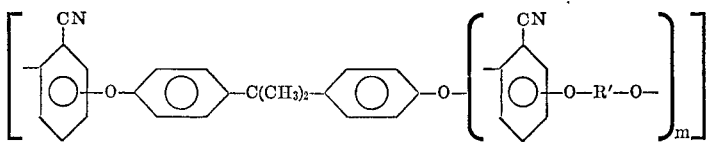

where R' is a divalent radical selected from the

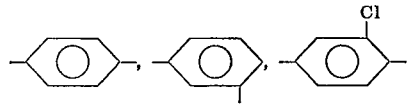

and

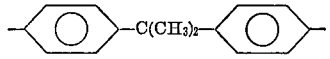

radicals, and the

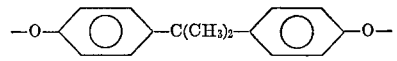

and —O—R'—O— groupings are ortho or para to the neighboring cyano group and m is 0 or 1.

2. A polymeric composition as in claim 1 where R' is the

grouping.

3. A polymeric composition as in claim 1 where R' is the

radical.

4. A polymeric composition as in claim 1 consisting essentially of the repeating unit of the formula

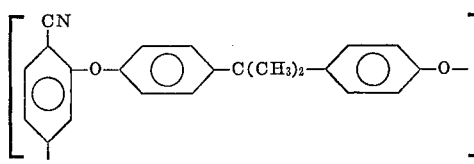

5. A polymeric composition as in claim 1 consisting essentially of the repeating unit

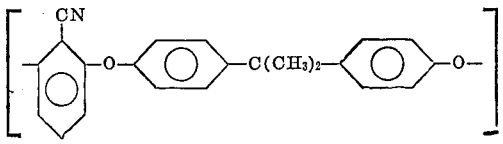

and

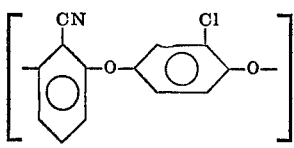

6. A polymeric composition as in claim 1 consisting essentially of the repeating unit

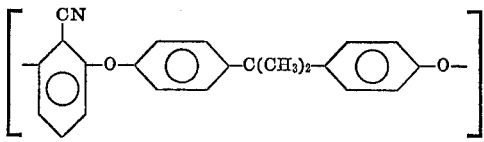

7. A polymeric composition as in claim 1 consisting essentially of the repeating unit

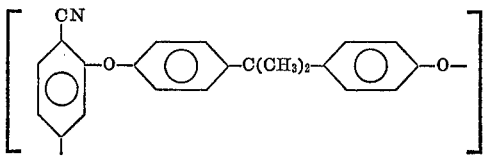

and

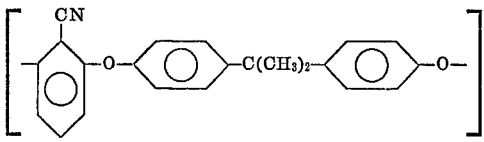

8. A polymeric composition as in claim 1 consisting essentially of the repeating unit

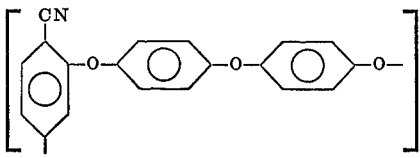

9. A polymeric composition as in claim 1 consisting essentially of recurring structural units of the formulas

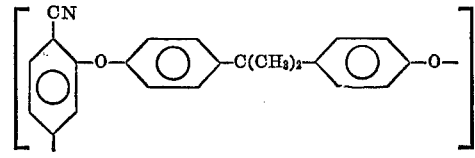

and

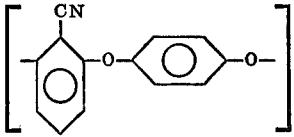

10. The process which comprises (1) forming an alkali-metal salt of an organic compound of the general formula

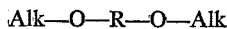

by forming a mixture of an alkali-metal carbonate and a dihydroxy compound of the general formula

HO—R—OH and (2) effecting reaction, in the presence of a dipolar aprotic solvent, between (a) the alkali-metal salt formed in (1), and (b) a benzenoid compound of the general formula

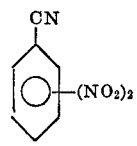

where the $NO_2$ radicals are in the 2,4- or 2,6-positions relative to the cyano group, R is a divalent carbocyclic aromatic radical, and Alk is an alkali metal atom.

11. The process as in claim 10 wherein Alk is sodium.

12. The process as in claim 10 wherein R is the

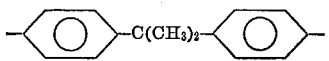

radical.

13. The process as in claim 10 wherein the dipolar aprotic solvent is dimethylsulfoxide.

14. The process as in claim 10 wherein the benzeneoid compound is 2,4-dinitrobenzonitrile.

15. The process as in claim 10 wherein the benzenoid compound is 2,6-dinitrobenzonitrile.

16. The process as in claim 10 wherein the alkali-metal salt is the disodium salt of resorcinol.

17. The process as in claim 10 wherein the alkali-metal salt is the disodium salt of hydroquinone.

18. The process as in claim 10 wherein the alkali-metal salt of the formula

is prepared by the addition of an alkali-metal carbonate to the mixture, in the dipolar apotic solvent, of the benzenoid compound and the precursor dihydroxy aromatic compound used to form the alkali-metal salt.

19. The process as in claim 10 wherein the alkali-metal salt is derived from the reaction of an alkali-metal carbonate and the precursor dihydroxy aromatic compound required to make the alkali-metal salt prior to addition of the benzenoid compound.

References Cited

Hine: Physical Organic Chemistry (2nd ed.), McGraw-Hill, New York, 1962, pp. 87 and 90.

Radlmann et al.: Makromol. Chem. 130, 45–54 (1969).

MELVIN GOLDSTEIN, Primary Examiner

U.S. Cl. X.R.

260—3, 13, 24, 37 M, 37 R, 47 ET, 49, 838, 857 R, 857 PA, 860, 901